Oct. 30, 1934.  J. W. BEECHER  1,978,665
PRESSURE GAUGE
Filed Feb. 4, 1933
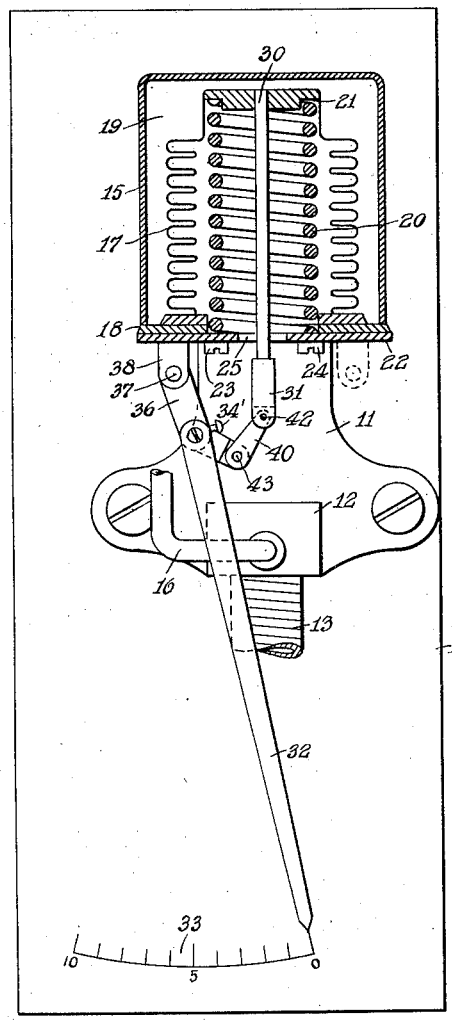
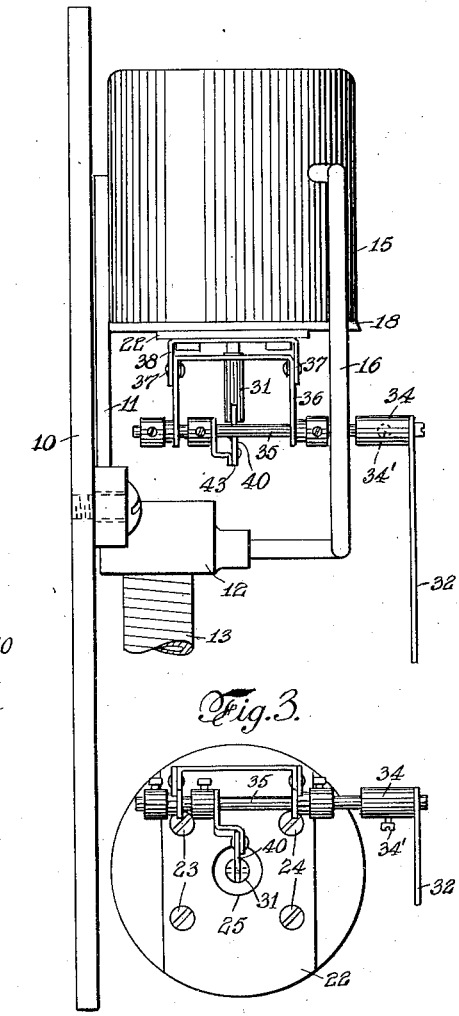
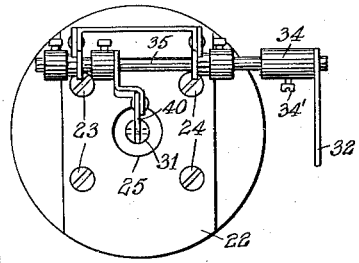
INVENTOR
JOHN WINFRED BEECHER
BY
ATTORNEY Patented Oct. 30, 1934

1,978,665

UNITED STATES PATENT OFFICE 1,978,665

PRESSURE GAUGE

John Winfred Beecher, Waterbury, Conn., assignor to The Bristol Company, Waterbury, Conn., a corporation of Connecticut Application February 4, 1933, Serial No. 655,207

8 Claims. (Cl. 73—110)

The invention relates to apparatus or gauges for measuring fluid pressure, and more particularly to the type of gauge in which a metallic bellows is made responsive to variations in the pressure under measurement.

In the determination of variable magnitudes by deflecting type instruments, it has been found desirable in many instances to separate the functions of providing a deflecting torque and a restoring torque from a single actuating or responsive member into two more or less independent members, as the more or less antagonistic requirements when combined in a single member become responsible for unsatisfactory results in measurements. The present invention has to do with a pressure responsive member embodying a metal bellows; and it is an object of the invention to provide a pressure measuring element which, while possessing all the advantages of a flexible metallic bellows, will have the permanence characterizing a high-grade steel spring, the walls of the bellows not primarily serving to furnish resistance to deformation.

Another object of the invention resides in the provision of a mounting for the resistance-supplying element which will admit of ready access to the element, as for removal or replacement of the same.

Still another object of the invention resides in the provision of means whereby the effect of the resistance-supplying element may be adjusted and a calibration provided without structural changes being made in the mechanism.

A still further object of the invention resides in the provision of a gauge of the aforesaid nature wherein the measuring member may readily the altered from one direction of angular movement to the opposite direction in response to changes in the measured quantity.

In carrying out the invention, a suitable extensible member or bellows is surrounded by a pressure chamber to which fluid whose pressure variations are to be measured is admitted; and within said bellows is mounted a resistance element, such as a helical spring element having its one end in engagement with the outer or closed end of the bellows. The mounting of this spring within the bellows is such that the spring element may readily be replaced; and provision is made for communicating to suitable measuring instrumentalities movement of said spring element, in response to changes in the measured quantity.

The transmitting mechanism between said spring element and the measuring mechanism is so arranged, furthermore, that angular movement will be imparted to the latter; and the same may readily be adjusted to move in one direction or in the opposite direction in response to a given change in the measured quantity. Means are provided, also, for adjusting the extent of movement of the measuring means per unit of movement resulting from a given change in the measured quantity, as by means of an intermediate friction joint included in the transmitting mechanism. To compensate for this adjustment, a further friction joint is included in the mounting means for the measuring mechanism.

The nature of the invention, however, will best be understood when described in connection with the accompanying drawing, in which:

Fig. 1 is a vertical section through the novel pressure gauge, with instrument casing removed.

Fig. 2 is a side view thereof.

Fig. 3 is an underneath plan view.

Referring to the drawing, 10 designates a base plate upon which the novel gauge may be mounted, for example through a bracket element 11 and to which is secured also the fitting 12 for a flexible tube 13 through which the fluid to be measured is introduced to the instrument. This fluid is designed to be received within a hood or cover member 15 through a tube connection 16 thereto from the fitting 12. Within the hood or cover 15 is mounted a resilient metal bellows 17 closed at its upper end and sealed with the hood at their bottom edges to an annular member 18. This affords a closed chamber 19 between the outer surface of the bellows and the said hood 15, fluid pressure being introduced through the tube 16 to the chamber.

Within the bellows is enclosed coaxially therewith a helical compression spring 20, formed of high carbon steel or other material having high elasticity. The upper end of spring 20 is adapted to rest within a circular groove 21 provided in the closed recessed end of the bellows, while the lower end of the spring rests upon a perforated plate 22 which is removably secured to the annular member 18 by two pairs of screws 23 and 24 arranged symmetrically upon opposite sides of the axis of the spring and the central perforation 25 of plate 22, the screws being adapted to fit into the annular member.

By this expedient, not only may plate 22 be readily removed from the annular member 18 to permit access to the spring 20 as for withdrawal and replacement, but due to the symmetrical arrangement of the holding screws the plate element 22 may be located in two diametrically opposed positions relatively to the said member 18.

Axially secured to the bellows at its outer end, is a relatively thin and more or less resilient rod 30 which extends through the central opening 25 in plate 22 and terminates at its outer end in a bearing member 31, said rod being adapted for longitudinal movements in conformity with the movements of the bellows under variations of pressure of fluid within the chamber 19.

These movements are designed to be communicated to suitable measuring means embodied, for example, in the indicating (or recording) arm 32 movable angularly over a suitably graduated scale 33 attached to the frame plate 10. The arm is carried by a hub 34 which is removably secured to either of the two ends of a shaft 35 in accordance with the position of the plate 22.

Shaft 35 in turn is journalled in a U-shape bearing member 36 secured in a pair of friction bearings or joints 37 of a further U-shape and supporting member 38 which is rigidly attached to the undersurface of plate 22. The center line of the two friction bearings 37 is perpendicular to the center line or longitudinal axis of the bellows and which is coaxial with the axis of spring 20. Shaft 35 may thus be angularly adjusted to different positions about the center line of the friction joint 37 by forcibly rotating the member 36 about the friction bearings 37.

Provision is made for communicating the longitudinal movements of rod 30 to the shaft 35 for angularly oscillating the latter, as by means of a normally rigid but jointed lever 40 which is rigidly secured at one end to the said shaft and at its opposite end is pivotally connected to the bearing member 31 as through a removable pin 42. The reciprocatory movement of the said rod 30 is thereby translated into an angular movement of the shaft 35 which in turn is reproduced by the indicator arm 32 when moving over scale 33.

In the operation of the gauge, the angular position of the arm 32 with respect to the graduated scale 33 will afford an indication of the fluid pressure prevailing in chamber 19, which pressure is balanced against the effect of spring 20. It will thus be noted that there is provided a pressure gauge in which the restoring force, instead of being derived from the more or less uncertain and erratic elasticity of a convoluted bellows element, is obtained principally from a helical spring, which spring may be produced of a form and material which will give the greatest permanency of calibration.

If it be desired to modify the scale length or movement of arm 32 for a given unit of movement of the rod 30, provision may be made for adjusting the length of lever 40. This may conveniently be accomplished by jointing the lever as in the provision of a friction joint 43 intermediate its attached ends. By applying force to the two lever portions, the effective length of the lever as a whole is varied, so that the radius about which rod 30 acts is changed with a consequent change in the angular movement of shaft 35 and in the deflection of pointer 32 attached thereto. While the resiliency of rod 30 permits it to accommodate itself to the curved path of the pivoting pin 42 for the small angle through which the pin travels, it is not desirable that permanent distortion be introduced into this rod by the change in the radius of the lever 40.

In order to overcome this contingency, use is made of the friction joints 37 for transversely shifting shaft 35 a corresponding distance, whereby the actual lateral distance between the pivot pin 42 and the vertical plane of the joints 37 remains constant, and the mean position of the rod 30 lies in the longitudinal axis of the bellows assembly. To provide for a zero adjustment of the pointer element 32, hub 34 is arranged to be clamped to the shaft 35 by means of a screw 34'.

Under certain conditions, it may be desirable to have the arm 32 move in a direction, opposite to that shown in the drawing, in response to pressure increase in the chamber 19, for example counter-clockwise. This may readily be accomplished in the assembly hereinbefore described merely by removing pivot pin 42 to detach the lever 40 from the rod 30 and then removing plate 22 from the annular member 18 by loosening the screws 23 and 24. Plate 22 is then swung around through an angle of 180°, (as indicated by the dotted line position of the attaching lug 38) the screws 23 and 24 inserted in plate 18, and pivot pin 42 returned to position to connect lever 40 to the bearing 31 of rod 30.

It will be necessary, also, to reverse the position of hub 34 on shaft 35, and this is accomplished by loosening screw 34' and transferring and securing the hub to the opposite end of the shaft which may be shifted axially to accommodate the hub.

I claim:

1. A pressure gauge comprising a bellows adapted for change in its longitudinal dimension with variations in applied pressure, said bellows being closed at its one end and open at the opposite end, a helical spring within the bellows and having its one end in engagement with the closed end thereof, an annular member secured to the open end of the bellows, a cap fitting over the bellows and sealed to said annular member to afford a closed chamber about the same, means to introduce fluid into the said chamber, a centrally perforated plate removably secured to the annular member and engaging the other end of the spring to retain it within the bellows and to hold it always in contact with the said bellows, measuring means, and intermediate mechanism actuated by movement of the said bellows and spring under variations of pressure of fluid applied to the chamber about said bellows.

2. A pressure gauge comprising a bellows adapted for change in its longitudinal dimension with variations in applied pressure, said bellows being closed at its one end and open at the opposite end, a helical spring within the bellows and having its one end in engagement with the closed end thereof, an annular member having an opening sufficiently large to pass the said spring and secured to the open end of the bellows, a cap fitting over the bellows and sealed to said annular member to afford a closed chamber about the same, means to introduce fluid into the said chamber, a centrally perforated plate removably secured to the annular member and engaging the other end of the spring to retain it within the bellows, and to hold it always in contact with the said bellows, measuring means, and intermediate mechanism actuated by movement of the said bellows and spring under variations of pressure of fluid applied to the chamber about said bellows.

3. A pressure gauge comprising a bellows adapted for change in its longitudinal dimension with variations in applied pressure, said bellows being closed at its one end and open at the opposite end, a helical spring within the bellows and having its one end in engagement with the closed end thereof, an annular member having an opening sufficiently large to pass said spring and secured to the open end of the bellows, a centrally perforated plate, measuring means carried thereby, symmetrically arranged securing means for attaching the perforated plate to the annular member whereby the measuring means carried by said plate may be oppositely disposed with respect to the moving spring element, said plate being adapted to retain the spring within the bellows and engaging the other end of the spring to hold it always in contact with the bellows, and intermediate mechanism actuated by movement of said bellows and spring.

4. In a pressure gauge including a member responsive to variations in applied pressure: measuring means actuated thereby, intermediate movement transmitting means comprising a friction joint whereby the extent of movement of the measuring means may be adjusted per unit of movement of the pressure responsive member, a displaceable mounting for said measuring means and including a joint which affords lateral adjustment of the said mounting to compensate for dimension changes in said transmitting means due to said first adjustment.

5. In a pressure gauge including a member responsive to variations in applied pressure: measuring means actuated thereby and including a rotatable shaft, movement transmitting means between the shaft and the pressure responsive member and comprising a friction-jointed lever secured to the shaft and adapted through said joint for adjustment of its length, and supporting means for the shaft comprising a friction joint whereby the said shaft may be displaced to compensate for adjustments in the length of the said lever.

6. A pressure gauge comprising a bellows adapted for change in its longitudinal dimension with variations in applied pressure, said bellows being closed at its one end and open at the opposite end, a helical spring within the bellows and having its one end in engagement with the closed end thereof, a centrally perforated plate adapted to retain the spring within the bellows and engaging the other end of the spring to hold it always in contact with the bellows, an actuating rod mounted in the longitudinal axis of the spring and bellows and engaging the closed end of the latter, said rod extending beyond the perforated plate for transmitting longitudinal movement of the bellows, measuring means, and a lever fixedly attached at its one end to the measuring means and at its opposite end pivotally attached to the said rod for imparting angular movement to the measuring means as the rod is reciprocated, said lever comprising an intermediate friction joint whereby the length of the lever may be adjusted to change the extent of movement of the measuring means per unit of movement of the rod.

7. A pressure gauge comprising a bellows adapted for change in its longitudinal dimension with variations in applied pressure, said bellows being closed at its one end and open at the opposite end, a helical spring within the bellows and having its one end in engagement with the closed end thereof, a centrally perforated plate adapted to retain the spring within the bellows and engaging the other end of the spring to hold it always in contact with the bellows, an actuating rod mounted in the longitudinal axis of the spring and bellows and engaging the closed end of the latter, said rod extending beyond the perforated plate for transmitting longitudinal movement of the bellows, measuring means, and a lever fixedly attached at its one end to the measuring means and at its opposite end pivotally attached to the said rod for imparting angular movement to the measuring means as the rod is reciprocated, said lever comprising an intermediate friction joint whereby the length of the lever may be adjusted to change the extent of movement of the measuring means per unit of movement of the rod, and a fixed arm supporting the measuring means and comprising a friction joint therebetween whereby the position of the measuring means may be adjusted to compensate for displacement resulting from changes in length of the lever.

8. A pressure gauge comprising a bellows adapted for change in its longitudinal dimension with variations in applied pressure, said bellows being closed at its one end and open at the opposite end, a helical spring within the bellows and having its one end in engagement with the closed end thereof, a centrally perforated plate adapted to retain the spring within the bellows and engaging the other end of the spring to hold it always in contact with the bellows, an actuating rod mounted in the longitudinal axis of the spring and bellows and engaging the closed end of the latter, said rod extending beyond the perforated plate for transmitting longitudinal movement of the bellows, measuring means, a lever fixedly attached at its one end to the measuring means and at its opposite end pivotally attached to the said rod for imparting angular movement to the measuring means as the rod is reciprocated, said lever comprising an intermediate friction joint whereby the length of the lever may be adjusted to change the extent of movement of the measuring means per unit of movement of the rod, an arm fixed at one end to the underside of the perforated plate and carrying said measuring means, and an arm fixed to the measuring means and frictionally joined to the plate arm whereby the position of the measuring means may be adjusted to compensate for displacement resulting from changes in length of the lever.

JOHN WINFRED BEECHER.